(12) United States Patent
Birru et al.

(10) Patent No.: US 8,233,505 B2
(45) Date of Patent: Jul. 31, 2012

(54) COORDINATION IN WIRELESS NETWORKS HAVING DEVICES WITH DIFFERENT PHYSICAL LAYER TRANSMISSION SCHEMES

(75) Inventors: Dagnachew Birru, Yorktown Heights, NY (US); Chun-Ting Chou, Taipei (TW); Alireza Seyedi, Fairport, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 198 days.

(21) Appl. No.: 12/526,363

(22) PCT Filed: Feb. 15, 2008

(86) PCT No.: PCT/IB2008/050562
§ 371 (c)(1),
(2), (4) Date: Mar. 8, 2010

(87) PCT Pub. No.: WO2008/099367
PCT Pub. Date: Aug. 21, 2008

(65) Prior Publication Data
US 2010/0189053 A1    Jul. 29, 2010

Related U.S. Application Data

(60) Provisional application No. 60/890,011, filed on Feb. 15, 2007.

(51) Int. Cl.
*H04J 1/16* (2006.01)
*H04L 12/56* (2006.01)

(52) U.S. Cl. .................. 370/503; 370/252; 370/329
(58) Field of Classification Search .............. 370/252, 370/329, 503
See application file for complete search history.

(56) References Cited

U.S. PATENT DOCUMENTS

| 2003/0186713 | A1 | 10/2003 | Sugaya | |
|---|---|---|---|---|
| 2005/0238113 | A1 | 10/2005 | Santhoff | |
| 2005/0250469 | A1* | 11/2005 | Laroia et al. | 455/403 |
| 2006/0198337 | A1* | 9/2006 | Hoang et al. | 370/329 |
| 2006/0245440 | A1 | 11/2006 | Mizukoshi | |

* cited by examiner

*Primary Examiner* — John Pezzlo
(74) *Attorney, Agent, or Firm* — Larry Liberchuk (57) ABSTRACT

A wireless network (300) operates with at least two different types of wireless devices, including Type-A wireless devices (320) that communicate using a first transmission scheme and Type-B wireless devices (310) that communicate using a second transmission scheme. Type-A wireless devices (320) can transmit Type-A beacons (325) using the first transmission scheme. Type-B wireless devices (310) can transmit and receive Type-B beacons (315) using the second transmission scheme. Type-B wireless devices (310) can also transmit Type-A beacons (325) using the first transmission scheme, but cannot receive the Type-A beacons (325). Before establishing communications in a new channel, a Type-B wireless device (310) performs power sensing to detect the presence of any non-Type-B wireless devices (200), and if such wireless devices (200) are detected, it switches to another channel. Otherwise, it transmits a Type-A beacon (325) and a Type-B beacon (315) to establish communications in the channel.

18 Claims, 8 Drawing Sheets

COORDINATION IN WIRELESS NETWORKS HAVING DEVICES WITH DIFFERENT PHYSICAL LAYER TRANSMISSION SCHEMES

This patent application claims the priority benefit under 35 U.S.C. §119(e) of U.S. Provisional Patent Application 60/890,011, filed on 15 Feb. 2007, the entirety of which is hereby incorporated by reference as if fully set forth herein.

This invention pertains to wireless communication networks, devices and methods, and more particularly, to coordination of wireless resource usage in wireless networks by wireless devices that communicate using different physical layer transmission schemes.

In next-generation wireless networks, wireless devices of different levels of complexity and cost are expected to share the same spectrum resources in a given vicinity. There are expected to be some "advanced" wireless devices (perhaps used in applications or apparatuses where cost is less of an issue) that have more advanced capabilities sharing spectrum with other "simple" wireless devices (perhaps used in applications or apparatuses where cost is more of an issue) that have reduced capabilities. In particular, the advanced wireless devices are expected to be able to communicate using a complicated but robust communication scheme at the physical (PHY) layer, while the simple wireless devices communicate using a simpler, less robust communication scheme. One example of this situation is illustrated by Wireless USB devices which communicate in accordance with the WiMedia common radio platform.

In general, in a given network and/or geographic region, there may be K different types of wireless devices communicating with K different physical layer transmission schemes (combination of modulation, coding, etc.) that provide different levels of robustness and/or data rates. To take a simplified example, in one case there may be simple wireless devices ("SDs") and advanced wireless devices ("ADs"). SDs may have a simple analog modulation such as minimum shift keying (MSK) or on-off keying (OOK), and may not have equalization and/or coding and decoding capability. Such SDs will not be able to perform in heavy multipath, but have low cost and power consumption. On the other hand advanced wireless devices ("ADs") may have an advanced digital modulation such as Single Carrier Block Transmission (SCBT) or Orthogonal Frequency Division Multiplexing (OFDM). In addition, they may have coding and encoding capability such as Convolutional Coding, Trellis Coded Modulation, Block Coding, etc. Such ADs will have the capability to transmit and receive successfully in heavy multipath, and will have considerably longer range compared to the SDs. In such a scenario, the most robust transmission scheme will be an advanced digital transmission scheme; however, the simple SDs will not be able to support this transmission scheme.

However, there is a need for the SDs and the ADs to be able to coordinate their common usage of the available wireless resources (frequency, space, time, etc.).

In both centralized and distributed wireless networks, beacons are widely used to convey important control information between wireless devices. For example, when a "new" wireless device is just turned on, or just moved into an area where one or more other wireless devices (e.g., a wireless access point) are already operating, the beacon includes important information that allows the "new" wireless device to establish communications with the other existing wireless device(s). Such information may include reservations of channels or frequencies, time slot assignments for data transmission, etc.

In the past, beacons typically have been broadcast so that any wireless device in the transmission range of the beaconing device can receive the beacon.

However, when these advanced wireless devices try to communicate in a given frequency band in a given geographical region using an "advanced" physical layer transmission scheme, and the simple wireless devices try to communicate in the same or an overlapping frequency band in the same or overlapping geographical region using a "simple" physical layer transmission scheme, potential problems exits.

Figure 1:
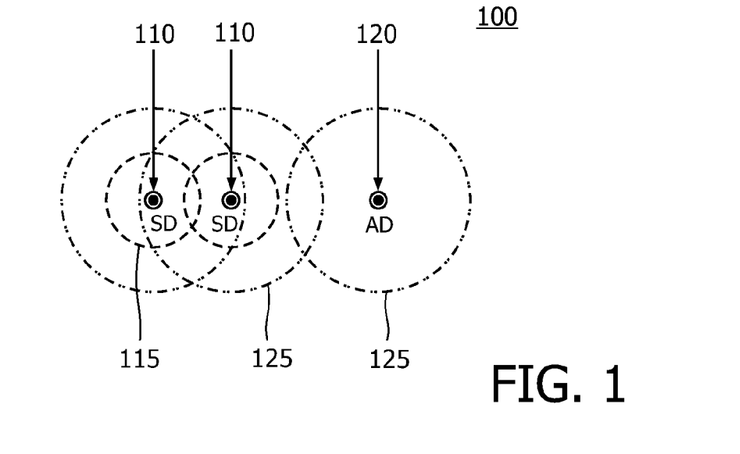
FIG. 1 illustrates an arrangement of two simple wireless devices and one advanced wireless device.

FIG. 1 illustrates an example arrangement 100 of wireless devices that illustrates this situation.

Arrangement 100 includes two simple wireless devices (SD) 110 operating in an overlapping frequency band in a same region as one advanced wireless device (AD) 120. In arrangement 100 illustrated in FIG. 1, advanced wireless device 120 transmits control frames or beacons 125 using a relatively complicated but more robust scheme. Meanwhile, simple wireless devices 110 transmit control frames or beacons 115 using a relatively simple but less robust scheme.

However, there is a co-existence problem between the simple wireless devices 110 and advanced wireless device 120. In particular, in arrangement 100, simple wireless devices 110 cannot receive or decode beacons 125 of advanced wireless device 120 due to the reduced capability of simple wireless devices 110. Therefore, simple wireless devices 110s may not be able to detect the existence of advanced wireless device 120 so that their transmissions do not interfere with each other.

Accordingly, it would be desirable to provide a method of coordinating devices in a wireless network where one or more wireless devices operate with one type of physical layer transmission scheme, and where other devices communicate with another type of physical layer transmission scheme. It would further be desirable to provide wireless devices capable of performing such a coordination process.

In one aspect of the invention, a communication system operates with at least two different types of wireless devices, including Type-A wireless devices that communicate using a first transmission scheme and Type-B wireless devices that communicate using a second transmission scheme, where the first transmission scheme is more robust than the second transmission scheme. Type-A wireless devices can transmit Type-A beacons using the first transmission scheme. Type-B wireless devices can transmit and receive Type-B beacons using the second transmission scheme. Type-B wireless devices can also transmit Type-A beacons using the first transmission scheme, but cannot receive the Type-A beacons. Before establishing communications in a new channel, a Type-B wireless device performs power sensing to detect the presence of any non-Type-B wireless devices, and if such devices are detected, it switches to another channel. Otherwise, it transmits a Type-A beacon and a Type-B beacon to establish communications in the channel.

In another aspect of the invention, a wireless device is adapted to communicate in a wireless network. The wireless device comprises: a transmitter adapted to transmit beacons of a first type using a first transmission scheme that cannot be received by the wireless device, and further adapted to transmit beacons of a second type using a second transmission scheme that is different than the first transmission scheme; and a receiver adapted to receive the beacons of the second type using the second transmission scheme.

In still another aspect of the invention, in a wireless network adapted to include at least two different types of wireless devices including Type-A wireless devices adapted to communicate using a first transmission scheme and Type-B wireless devices adapted to communicate using a second transmission scheme, a method is provided for communication by a Type-B wireless device. The method comprises: testing the availability of a first communication channel by performing a power sensing operation to determine whether the channel is being used by any other wireless device that operates using a transmission scheme different from the second transmission scheme; when the power sensing indicates that the channel is being used by another wireless device that operates using a transmission scheme different from the second transmission scheme, then switching to another channel and performing a new power sensing operation in the other channel; and when the power sensing indicates that that the channel is not being used by any other wireless device that operates using a transmission scheme different from the second transmission scheme, then transmitting a beacon of a first type using the first transmission scheme that cannot be received by the Type-B wireless device, and transmitting a beacon of a second type using the second transmission scheme.

In yet another aspect of the invention, in a wireless network adapted to include at least two different types of wireless devices including Type-A wireless devices adapted to communicate using a first transmission scheme and Type-B wireless devices adapted to communicate using a second transmission scheme different from the first transmission scheme, a method of communication is provided for a first Type-A wireless device. The method comprises: searching a channel for any beacons of a first type transmitted using the first transmission scheme that cannot be received by the Type-B wireless devices; decoding any received beacons of the first type to determine if any wireless devices other than Type-A wireless devices are operating in the channel; and when no beacons of the first type are received that indicate that any wireless devices other than Type-A wireless devices are operating in the channel, then transmitting in the channel a beacon of the first type using the first transmission scheme that cannot be received by the Type-B wireless devices.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided as teaching examples of the invention.

Figure 2:
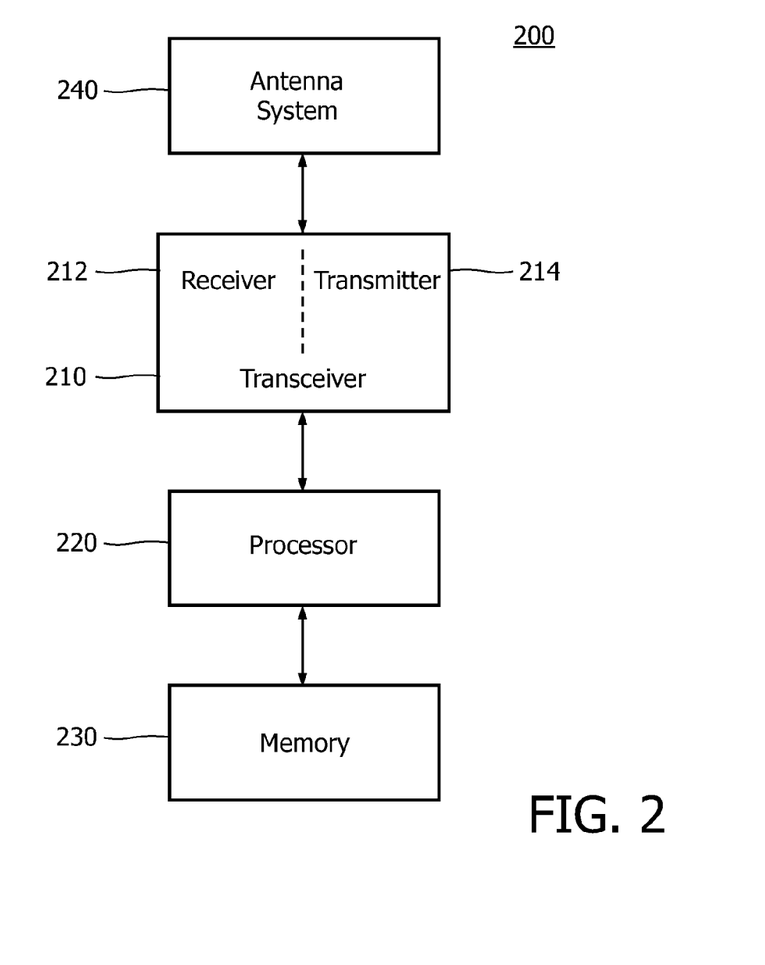
FIG. 2 is a functional block diagram of one embodiment of a wireless device.

FIG. 2 is a functional block diagram of a wireless device 200. As will be appreciated by those skilled in the art, one or more of the various "parts" shown in FIG. 2 may be physically implemented using a software-controlled microprocessor, hard-wired logic circuits, or a combination thereof. Also, while the parts are functionally segregated in FIG. 2 for explanation purposes, they may be combined variously in any physical implementation.

Wireless device 200 includes a transceiver 210, processor 220, memory 230, and an antenna system 240.

Transceiver 210 includes a receiver 212 and a transmitter 214. Transceiver 210 provides functionality for wireless device 200 to communicate with other wireless devices in a wireless communication network according to the standard protocols of the wireless communication network. For example, in one embodiment wireless device 200 is a wireless device adapted to operate using a communication protocol according to the WiMedia specifications.

Processor 220 is configured to execute one or more software algorithms in conjunction with memory 230 to provide the functionality of wireless device 200. Beneficially, processor 220 includes its own memory (e.g., nonvolatile memory) for storing executable software code that allows it to perform the various functions of wireless device 200. Alternatively, the executable code may be stored in designated memory locations within memory 230.

In FIG. 2, in one embodiment antenna system 240 may be a directional antenna system provides a capability for wireless device 200 to select from a plurality of antenna beams for communicating with other wireless devices in a plurality of directions. In one embodiment, directional antenna system 240 comprises a plurality of antennas each corresponding to one antenna beam. In another embodiment, directional antenna system 249 comprises a steerable antenna that can combine a plurality of different antenna elements to form a beam in a plurality of different directions.

In general a large number of different types of wireless devices 200 may be supported in a communication network, each transmitting according to a corresponding type of transmission scheme. In general, all wireless devices 200 in the wireless network will have one of K different PHY designs (e.g., modulation, error correction coding, etc.), namely $PHY_0, \ldots, PHY_{K-1}$, and will communicate according to a corresponding on of K different transmission schemes each having different levels of robustness and/or data rate and/or complexity. One of the transmission schemes in one of these PHY designs (e.g., $PHY_0$) is selected as a "common signaling scheme." Beneficially, $PHY_0$ corresponds to the most robust transmission scheme employed in the wireless network.

Fortuitously, in general the majority of the complexity and expense for a wireless device 200 to fully implement the robust common signaling scheme ($PHY_0$) resides in the receiver 212 (e.g., analog-to-digital converter; equalizer; error correction decoder; etc.) and implementation of a transmitter 214 capable of transmitting a signal according to the common signaling scheme is relatively minor.

Accordingly, beneficially all wireless devices 200 in a wireless network transmit all signaling packets (beacons) using this common signaling scheme corresponding to the $PHY_0$ design. If the PHY design of a particular wireless device 200 is not $PHY_0$, then that wireless less device 200 will also transmit its own beacons using the transmission scheme corresponding to its own PHY design.

On the other hand, not all wireless devices 200 are required to be able to receive signals (e.g., beacons) transmitted with the common signaling scheme. That is, in general non-$PHY_0$ wireless devices 200 do not have a $PHY_0$ compatible receiver 212. This means that the non-$PHY_0$ wireless devices 200 will not be able to receive the beacons transmitted by wireless devices 200 that have other PHY designs (e.g., $PHY_0$), but they are still able to receive the beacons from wireless devices 200 with a similar PHY design. On the other hand, wireless devices 200 having the $PHY_0$ design will be able to receive the beacons from all wireless devices 200.

In summary:

$PHY_0$ wireless devices 200 have both a transmitter 214 and a receiver 212 for communicating with a $PHY_0$ transmission scheme. $PHY_0$ wireless devices 200 are fully aware of the operation of all wireless devices 200 through the beacons that employ the common $PHY_0$ transmission scheme; and Non-$PHY_0$ (e.g. $PHY_n$) wireless devices 200 are aware of the operation of wireless devices 200 that have similar PHY designs and operate with the same transmission scheme, through the beacons transmitted with the transmission scheme corresponding to the $PHY_n$ design. Moreover, non-$PHY_0$ wireless devices 200 will employ power sensing to the presence of other wireless devices 200 operating in a communication channel with other PHY designs and communicating with different transmission schemes.

With this arrangement, any number of wireless devices 200 that use the same PHY design and communicate with a corresponding transmission scheme are able to form a network using the beacons that are transmitted using the transmission scheme corresponding to their own PHY. Furthermore, the $PHY_0$ devices will still be able to use the wireless resources that are not used by wireless devices 200 that have other PHY designs.

Figure 3:
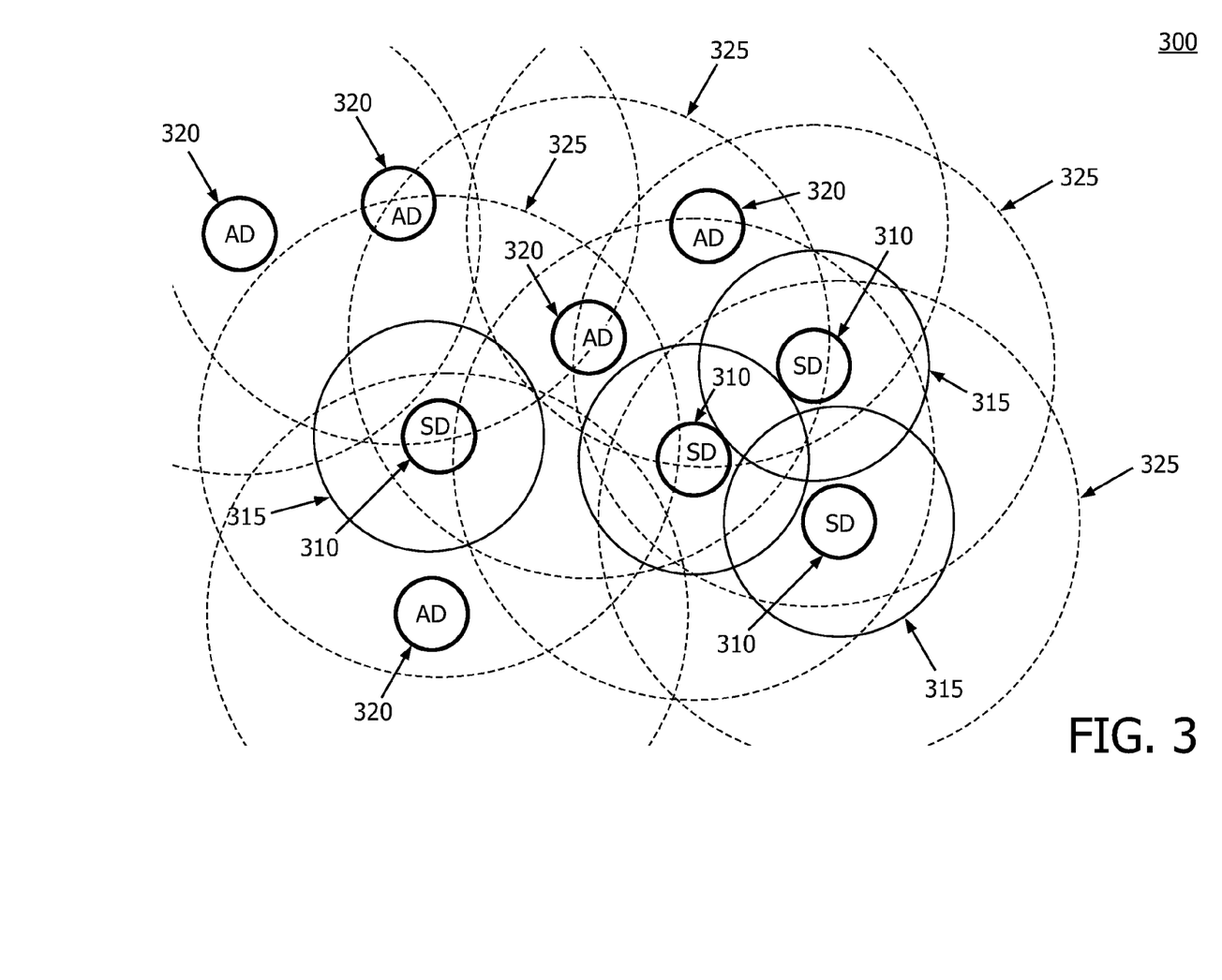
FIG. 3 illustrates one exemplary embodiment of a wireless system.

FIG. 3 illustrates one exemplary embodiment of a wireless system 300 operating according to principles set forth above. For simplification of the discussion and illustration only two types of communication devices are shown in FIG. 3. Wireless network 300 includes simple wireless devices (SD) 310 (also known as "Type-B" wireless devices) operating in an overlapping frequency band in a same region as advanced wireless devices (AD) 320 (also known as "Type-A" wireless devices). Simple wireless devices 310 and/or advanced wireless device 320 may have the architecture of wireless device 200 of FIG. 2. Illustratively, advanced wireless devices 320 may include computers, mobile telephones, personal digital assistants (PDAs), or similar wireless devices that may operate in a wireless network. It is noted that only a few advanced and simple wireless devices 320 and 310 are shown in FIG. 3; this is merely for simplicity of discussion. Clearly, many other advanced and simple wireless devices 320 and 310 may exist.

In wireless system 300, AD devices 320 communicate with each other using a first transmission scheme according to a first physical layer (PHY) design, while SD devices 310 communicate with each other using a second transmission scheme according to a second physical layer (PHY) design. Each transmission scheme and physical design PHY has its own corresponding specification for error correction encoding, interleaving, symbol mapping, modulation etc., and at least one of these parameters differs between the first transmission scheme and the second transmission scheme. In the example of FIG. 3, the first transmission scheme is more robust than the second transmission scheme, However, reception of a signal according to the first transmission scheme also requires, in general, a more complicated receiver than is necessary for receiving a signal according to the second transmission scheme. In wireless system 300, in general simple wireless devices 310 transmit and/or receive over a first communication range; and advanced wireless devices 320 transmit and/or receive over a second communication range which is greater than the first communication range. The noted ranges may be indicative of the complexity of the coding, interleaving, and/or modulation formats employed by the corresponding transmission scheme.

Furthermore, advanced wireless devices 320 transmit signaling packets as control frames or beacons (hereinafter referred to as "AD beacons" or "Type-A beacons") 325 using a relatively complicated but more robust transmission scheme. In a case where advanced wireless devices 320 employ the Ecma media access control (MAC) protocol, AD beacons 325 may be transmitted using the specified "common beacon mode for Type-A." Meanwhile, simple wireless devices 310 transmit control frames or beacons (hereinafter referred to as "SD beacons") 315 using a relatively simple but less robust transmission scheme. Where simple wireless devices 310 employ the Ecma MAC protocol, beacons may be transmitted using the specified "common beacon mode for Type-B".

In wireless system 300, simple wireless devices 310 are capable of transmitting and receiving SD beacons 315. Beneficially, each simple wireless device 310 can also transmit an AD beacon 325 in addition to its SD beacon 315. However, due to the complexity of the requirements for an AD receiver 212, simple wireless device 310 cannot receive the AD beacon 325. As will be appreciated, the ability for simple wireless devices 310 facilitates the ability of advanced wireless devices 320 to be made aware of the presence of simple wireless devices 310 and the communication resources which they are using. In that case advanced wireless devices 320 require more complex signal processing capabilities—and typically cost more—than simple wireless devices 310. In general, the range of advanced devices is larger than the range of simple devices.

In one embodiment, advanced and simple wireless devices 320 and 310 communicate within a communication structure that includes a repeating communication pattern such as superframes, and their beacons 315 and 325 are transmitted within these superframes.

Figure 4:
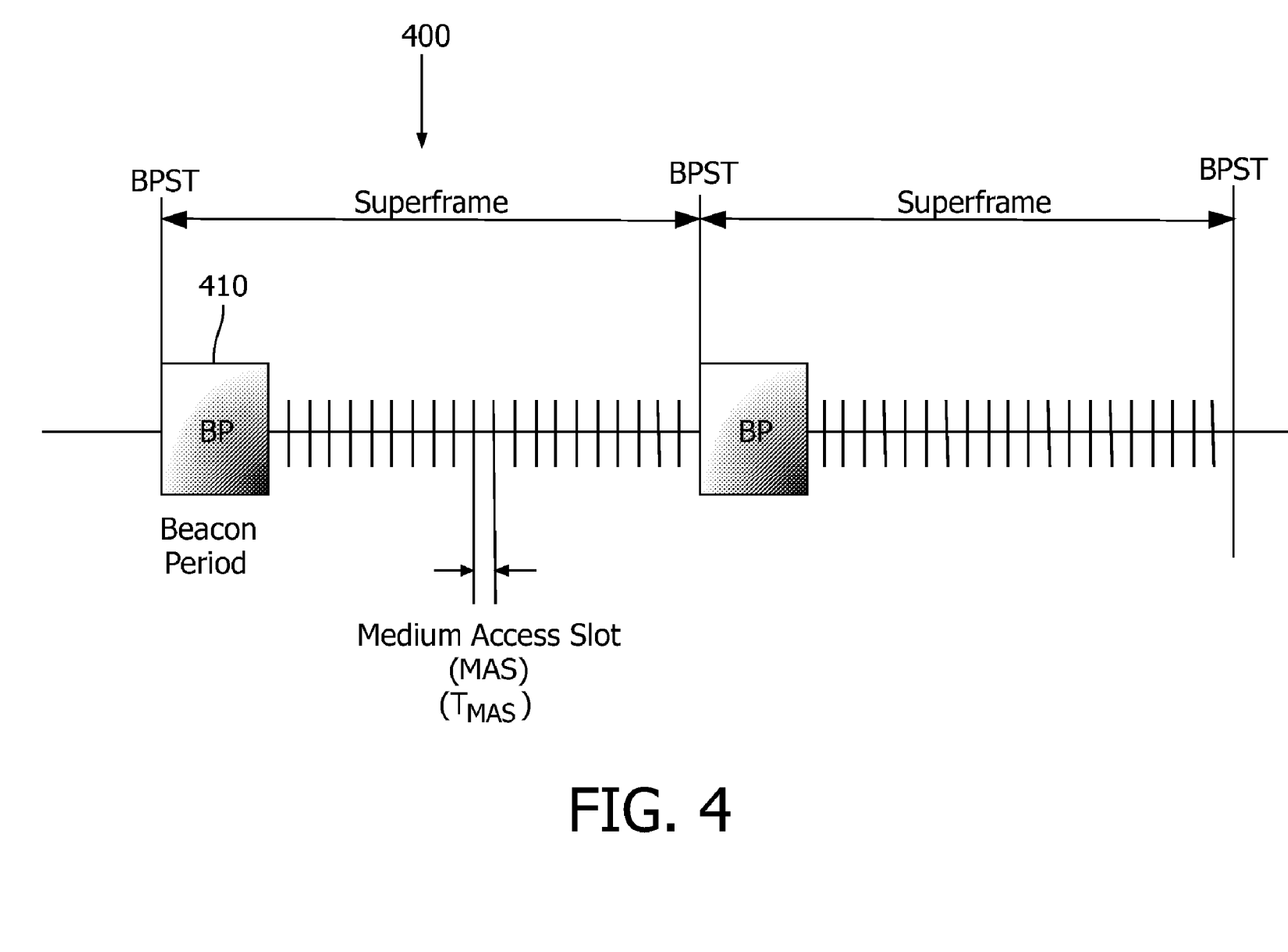
FIG. 4 illustrates one exemplary embodiment of a superframe.

FIG. 4 illustrates one exemplary embodiment of a superframe 400 by which advanced and simple wireless devices 320 and 310 may communicate. Superframe 400 includes a beacon period (BP) 410. It should be understood that superframe 400 is not drawn to scale and, in some embodiments, BP 410 comprises a very small portion of the entire superframe 400.

It should be appreciated that BP 410 provides a fully distributed and autonomous mechanism for coordination of advanced and simple wireless devices 320 and 310, and better spectrum use by advanced and simple wireless devices 320 and 310. Beneficially, in this way beacon coordination does not rely on a central coordinator.

Figure 5:
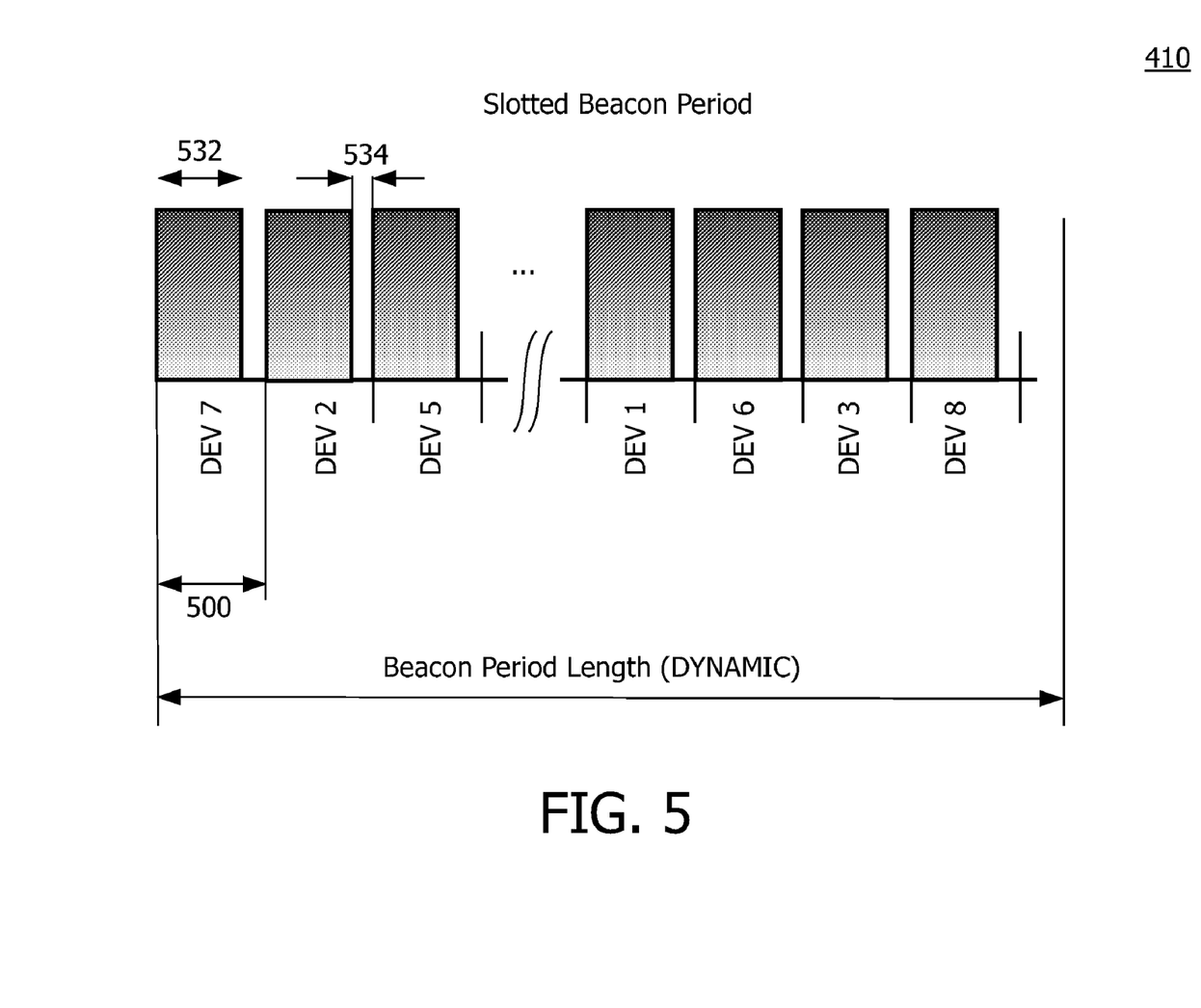
FIG. 5 illustrates one exemplary embodiment of a beacon period for transmission of beacons by beaconing device(s) within a close vicinity of each other.

FIG. 5 illustrates one exemplary embodiment of a BP 410 in a superframe 400 for transmission of beacons by advanced and simple wireless devices 320 and 310. BP 410 comprises a plurality of beacon slots 500, each of which may be occupied by an AD beacon 325 transmitted by an advanced wireless device 320 or a simple wireless device 310, or an SD beacon 315 transmitted by a simple wireless device 310. As described in greater detail below, in one embodiment, a beacon transmitted by an advanced or simple wireless device 320 or 310 within BP 510 may include beacon parameters and one or more information elements (IEs). In one embodiment, beacon parameters may include one or more of the following: a Device Address (DevAddr); a Beacon Slot Number; etc.

Figure 6:
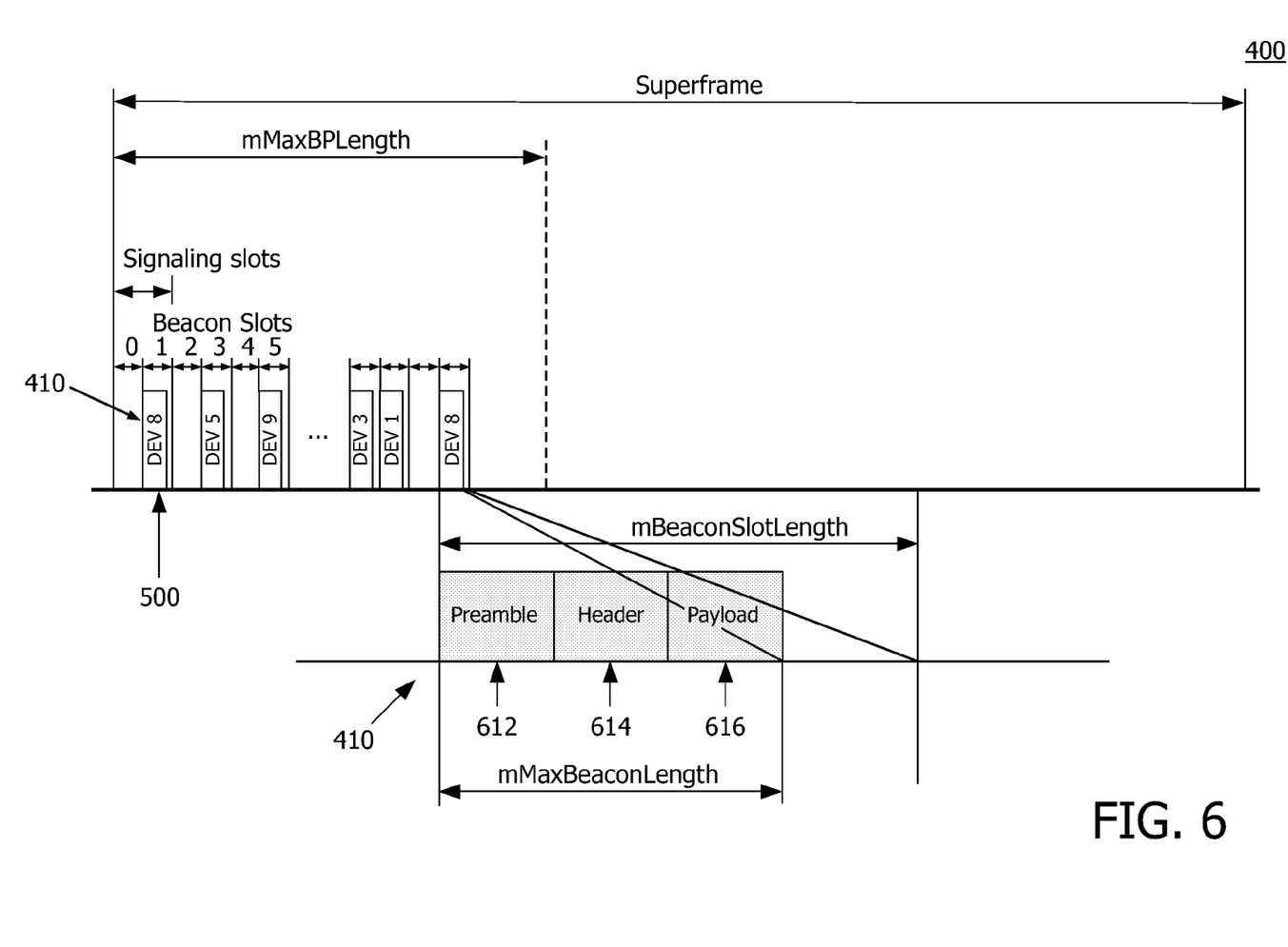
FIG. 6 illustrates a more detailed view of one exemplary embodiment of the superframe and beacon period of FIG. 4.

FIG. 6 illustrates a more detailed view of one exemplary embodiment of the superframe 400 of FIG. 4. As can be seen in FIG. 6, each BP 410 includes a plurality of beacon slots 500, some or all of which are occupied by beacons 610, each of which may be an AD beacon 325 or an SD beacon 315. In one embodiment, each beacon 610 includes a preamble 612, a header 614, and a beacon payload 616. As illustrated in FIG.

6, in one embodiment, the lengths of each BP 410 are variable up to a corresponding maximum beacon period length. Also, as shown in FIG. 5, each beacon slot 500 comprises a corresponding beacon length 532 and guard time 534.

Figure 7:
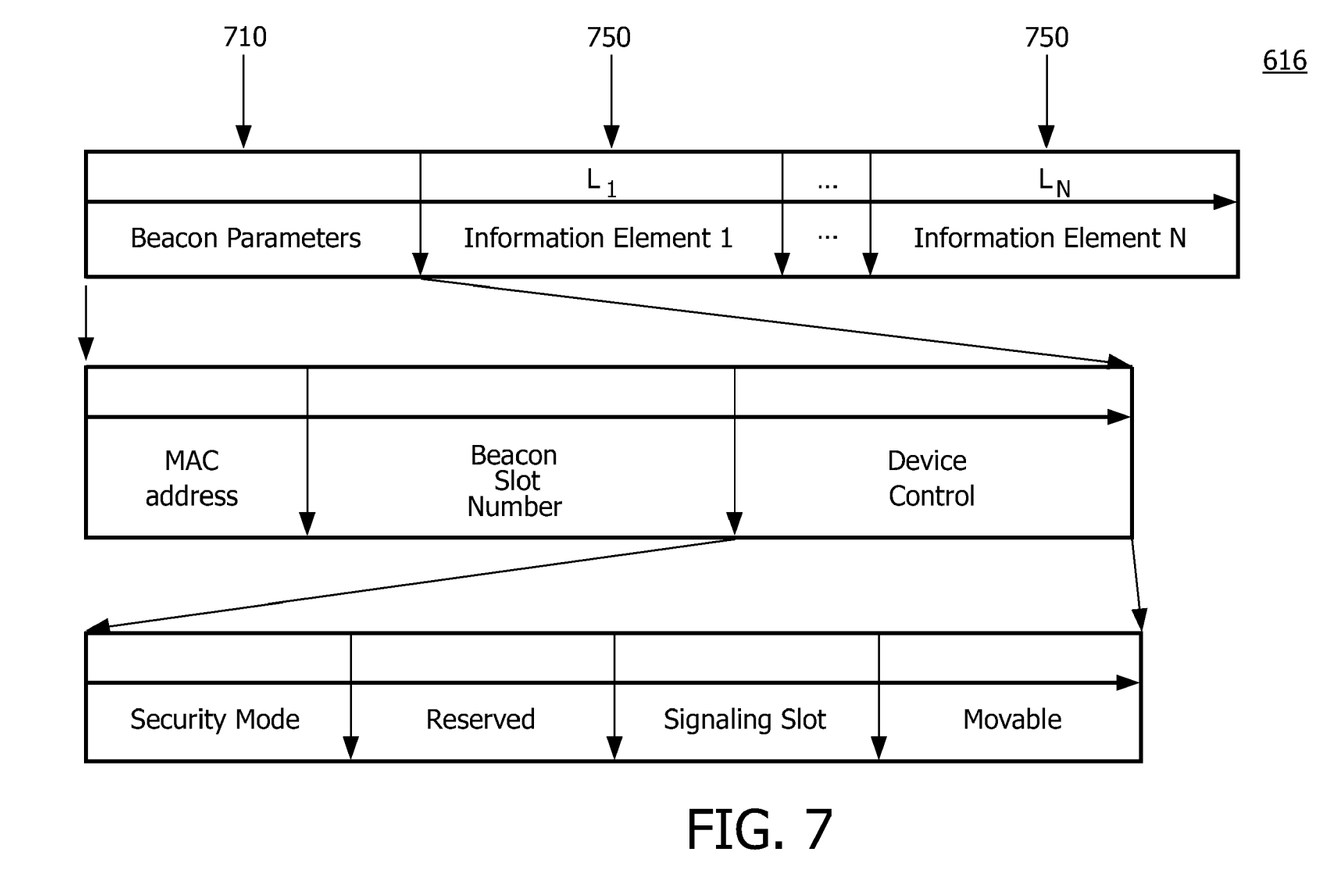
FIG. 7 illustrates one exemplary embodiment of a beacon frame payload.

FIG. 7 illustrates one exemplary embodiment of a beacon payload 616. Beacon payload 616 includes one or more beacon parameters 710 and one or more information elements 750.

Beneficially, beacon parameters 710 identify parameters of the beacon. Exemplary beacon parameters 710 may include a Device Identifier, a Beacon Slot Number, and Beaconing Device Control parameters, such as a Security Mode at which the device is operating, etc. Beneficially, beacon IEs 750 comprises data transmitted by an advanced or simple wireless device 320 or 310 that may include information about the transmitting device and/or wireless system 300.

Now, with the explanation of superframes and beacon periods as described above with respect to FIG. 4-7 in mind, we turn back to the system 300 of FIG. 3. It can now be understood that wireless devices in system 300 must maintain a level of coordination with each other so that they do not interfere with each other.

The scenarios described below demonstrate exemplary embodiments of some of the operation rules.

Scenario 1:

If two non-$PHY_0$ wireless devices 200 (e.g., $PHY_n$ wireless devices 200) "wake-up in a channel, first they perform power sensing to detect whether any other wireless devices 200 communicating with any other transmission schemes are operating in the channel. If they find that the channel is being used by devices having a different PHY design (e.g., $PHY_m$) and communicating signals with a corresponding different transmission scheme, they will leave the channel and move to another channel. If, however, they find that the channel is not being used by devices having a different PHY design (e.g., $PHY_m$), then they will establish their network (e.g. a super frame and beacon period) and start communication. In particular, the $PHY_n$ wireless devices 200 will transmit a signaling packet (beacon) using a transmission scheme corresponding to the $PHY_n$ design, and another signaling packet (beacon) using a transmission scheme corresponding to the $PHY_0$ design.

If other wireless devices 200 having the $PHY_n$ design and communicating with the corresponding transmission scheme subsequently enter the channel, they will learn of the existence and operation of this network (through $PHY_n$ beacons), and will join the network.

If other $PHY_m$ wireless devices 200 (m is not equal to 0 or n) subsequently enter the channel, they also perform power sensing within the channel and thereby learn that the channel is being used by wireless devices 200 having a different another PHY (i.e. $PHY_n$), and therefore they will leave the channel and move to another channel.

If other $PHY_0$ wireless devices subsequently enter the channel, then they will receive the beacons that were transmitted using the transmission scheme corresponding to the $PHY_0$ design ($PHY_0$ beacons) and thereby discover operation of this network. Since these wireless devices 200 are fully aware of the operation of the $PHY_n$ network, they are able to use any unused (unreserved) resources (e.g., medium access slots) in the channel. The $PHY_0$ wireless devices 200 will also transmit $PHY_0$ beacons for reception by other $PHY_0$ wireless devices 200.

Once the $PHY_n$ wireless devices 200 learn (i.e., through power sensing) that wireless devices 200 having another PHY is using their unused time, then they will no longer reserve new time in the channel Scenario 2:

If two $PHY_0$ wireless devices 200 wake up in a channel, and discover (through $PHY_0$ beacons) that the channel is being used by another other wireless devices 200 having a different PHY design, then they may leave the channel and move to another channel. However, if they find that the channel is unoccupied, then they will establish a network (e.g. a super frame and beacon period) and start communication. They will transmit signaling packets (beacons) using the transmission scheme corresponding to the $PHY_0$ design.

If other $PHY_0$ wireless devices 200 subsequently enter the channel, they will discover the existence and operation of this network (through $PHY_0$ beacons), and will join the network.

If other $PHY_m$ devices 200 (m is not equal to 0) enter the channel, then they will sense power and discover that the channel is being used by other wireless devices 200 having a different PHY design), and they will leave the channel and move to another channel.

Scenario 3:

If two networks (one $PHY_0$ and one non-$PHY_0$) are already established, but these networks come into each other's proximity, then the $PHY_0$ network will learn about the other network through $PHY_0$ signaling packets (beacons). In that case, the $PHY_0$ network will adapt to the non-$PHY_0$ network and will only use the unused (unreserved) resources (e.g., medium access slots) within the channel, so that it does not cause interference to the non-$PHY_0$ network.

In another embodiment, all of the wireless devices 200 will transmit beacons using all of the transmission schemes corresponding to all of the existing PHY designs; however, they will only be able to receive beacons transmitted with the transmission scheme corresponding to their own PHY design. In this case, the wireless devices 200 having the robust PHY designs will still have to rely on power sensing to avoid interference with the $PHY_0$ devices, but if they receive the beacons that were transmitted using their own PHY, then they can opportunistically use the information contained therein.

The arrangement as described above allows the use of a robust common signaling scheme for wireless devices having all of the different PHY designs without significant increase in complexity in the simple devices.

Figure 8:
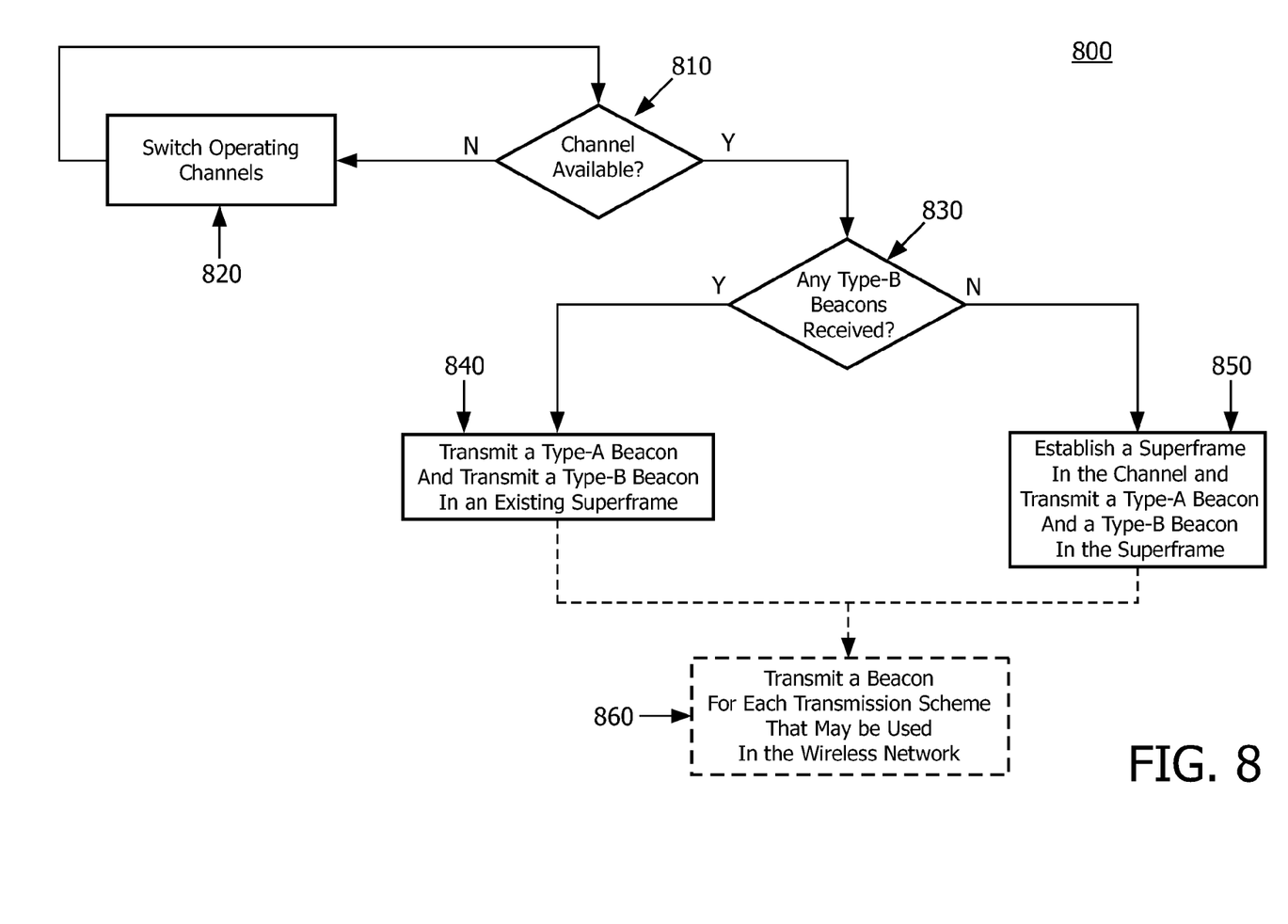
FIG. 8 is a flowchart illustrating one example embodiment of a method for a simple wireless device to communicate in a communication network.

FIG. 8 is a flowchart illustrating one example embodiment of a method 800 for a simple wireless device 310 to communicate in a communication network. At least two types of wireless devices 200 are assumed to be able to operate with the wireless network: advanced ("Type-A") wireless devices 320 communicating according to a first transmission scheme, and simple ("Type-B") wireless devices 310 communication according to a second transmission scheme.

In a first step 810, a first simple wireless device 310 tests the availability of a first communication channel by first performing a power sensing operation to determine whether the channel is being used by any other wireless device that operates using a transmission scheme different from the second transmission scheme.

If the power sensing in step 810 indicates that the channel is being used by another wireless device 200 that operates using a transmission scheme different from the second transmission scheme, then the process proceeds to a step 820 wherein the first simple wireless device 310 switches to another channel. Then, the process returns to step 810 to perform a new power sensing operation in the new channel.

On the other hand, if the power sensing in step 810 indicates that the channel is not being used by any other wireless device 200 that operates using a transmission scheme different from the second transmission scheme, then in a step 830 the first simple wireless device 310 searches the channel for any Type-B beacons 315 transmitted using the second transmission scheme.

In a step 840, when the first simple wireless device 310 detects Type-B beacons 315 in the channel, then the first simple wireless device 310 transmits a Type-A beacon 325 using the first transmission scheme and transmits a Type-B beacon 315 using the second transmission scheme, in an existing superframe of the channel.

Meanwhile, in a step 850, when the first simple wireless device 310 does not detect any Type-B beacons 315 in the channel, then the first simple wireless device 310 establishes a superframe in the channel and transmits via the superframe a Type-A beacon 325 using the first transmission scheme, and a Type-B beacon 315 using the second transmission scheme.

In an optional step 860 according to one embodiment, the first simple wireless device 310 transmits via the superframe one or more other beacons according to one or more other transmission schemes employed by one or more other wireless devices 200. In general, where the wireless network includes wireless devices 200 that are each adapted to communicate using any one of K different types of transmission schemes, then the first simple wireless device 310 may transmit K different beacons for each of the K different transmission schemes that may be employed in the wireless network.

Of course the various steps in method 800 may be rearranged for convenience in order to attain the intended objectives.

Figure 9:
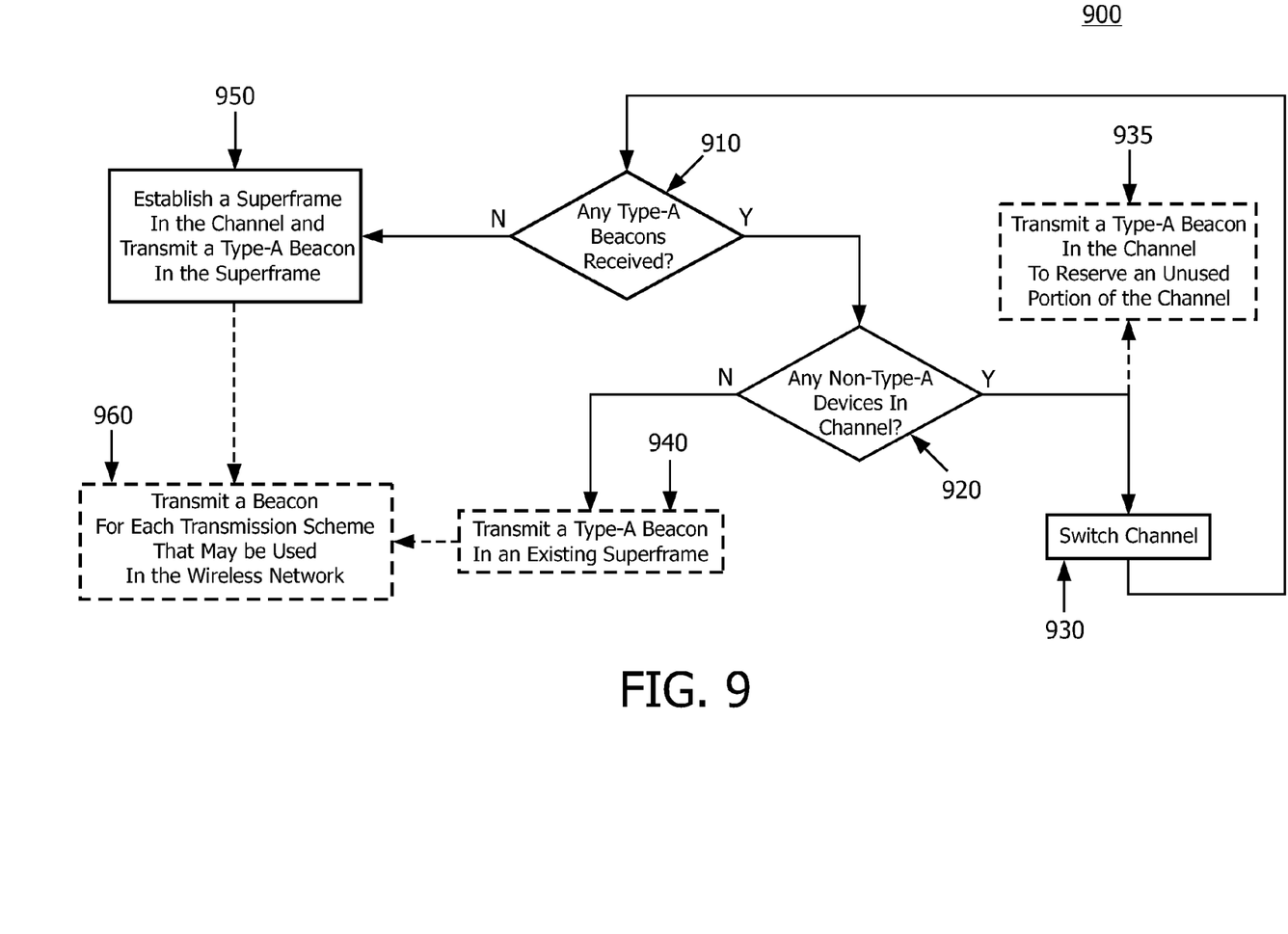
FIG. 9 is a flowchart illustrating one example embodiment of a method for an advanced wireless device to communicate in a communication network.

FIG. 9 is a flowchart illustrating one example embodiment of a method 900 for an advanced wireless device 200 to communicate in a communication network. At least two types of wireless devices 200 are assumed to be able to operate with the wireless network: advanced ("Type-A") wireless devices 320 communicating according to a first transmission scheme, and simple ("Type-B") wireless devices 310 communication according to a second transmission scheme.

In a first step 910, a first advanced wireless device 320 searches a channel for any Type-A beacons 325 transmitted using the first transmission scheme that cannot be received by the Type-B wireless devices 310.

If the first advanced wireless device 320 detects any Type-A beacons 325, then in a step 920 the first advanced wireless device 320 decodes any received Type-A beacons 325 to determine if any wireless devices 200 other than Type-A wireless devices 320 is operating in the channel.

In a step 930, when the first advanced wireless device 320 detects at least one Type-A beacon 325 in the channel indicating that one or more other wireless devices 200 other than Type-A wireless devices 320 are operating in the channel, then the first advanced wireless device 320 switches to a second channel and returns to step 910 above. Optionally, instead of step 930, in a step 935 the first advanced wireless device 320 may transmit in the channel a Type-A beacon 325 using the first transmission scheme to reserve a portion of the channel that is not being used by any of the one more other wireless devices 200.

In a step 940, when the first advanced wireless device 320 detects at least one Type-A beacon 325 in the channel indicating that another advanced wireless device 320 is operating in the channel, then the first advanced wireless devices 310 transmits a Type-A beacon 325 using the first transmission scheme in an existing superframe of the channel.

Meanwhile, in a step 950, when the first advanced wireless device 320 does not detect any Type-A beacons 325 in the channel, then the first advanced wireless device 320 establishes a superframe in the channel and transmits via the superframe a Type-A beacon 325 using the first transmission scheme.

In an optional step 960 according to one embodiment, the first advanced wireless device 320 transmits via the superframe one or more other beacons according to one or more other transmission schemes employed by one or more other wireless devices 200. In general, where the wireless network includes wireless devices 200 that are each adapted to communicate using any one of K different types of transmission schemes, then the first advanced wireless device 320 may transmit K different beacons for each of the K different transmission schemes that may be employed in the wireless network.

Of course the various steps in method 900 may be rearranged for convenience in order to attain the intended objectives.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

The invention claimed is:

1. A wireless device adapted to communicate in a wireless network, the wireless device comprising:
    a transmitter adapted to transmit beacons of a first type using a first transmission scheme that cannot be received by the wireless device, and further adapted to transmit beacons of a second type using a second transmission scheme that is different than the first transmission scheme; and
    a receiver adapted to receive the beacons of the second type using the second transmission scheme.

2. The wireless device of claim 1, wherein, when the wireless device desires to operate in a new channel, the receiver first performs power sensing to determine if the channel is being used by any other wireless device that operates using any transmission scheme different from the second transmission scheme, and when the wireless device determines from the power sensing that the channel is not being used by any other wireless device, then searching the channel for any beacons of the second type.

3. The wireless device of claim 2, wherein when the wireless device detects beacons of the second type in the channel, then the wireless device transmits a beacon of the first type using the first transmission scheme and a beacon of the second type using the second transmission scheme in an existing superframe of the channel.

4. The wireless device of claim 2, wherein when the wireless device does not detect any beacons of the second type in the channel, then the wireless device establishes a superframe in the channel and transmits via the superframe a beacon of the first type using the first transmission scheme and a beacon of the second type using the second transmission scheme.

5. The wireless device of claim 1, wherein when the wireless device determines from the power sensing that the channel is being used by another wireless device that operates using a transmission scheme different from the second transmission scheme, then the wireless device switches to another channel and the receiver performs a new power sensing operation in the other channel.

6. The wireless device of claim 1, wherein the transmitter is further adapted to transmit beacons of a third type using a third transmission scheme that cannot be received by the wireless device.

7. In a wireless network adapted to include at least two different types of wireless devices including Type-A wireless devices adapted to communicate using a first transmission scheme and Type-B wireless devices adapted to communicate using a second transmission scheme, a method of communication by a Type-B wireless device comprising:
   testing the availability of a first communication channel by performing a power sensing operation to determine whether the channel is being used by any other wireless device that operates using a transmission scheme different from the second transmission scheme;
   when the power sensing indicates that the channel is being used by another wireless device that operates using a transmission scheme different from the second transmission scheme, then switching to another channel and performing a new power sensing operation in the other channel; and
   when the power sensing indicates that that the channel is not being used by any other wireless device that operates using a transmission scheme different from the second transmission scheme, then transmitting a beacon of a first type using the first transmission scheme that cannot be received by the Type-B wireless device, and transmitting a beacon of a second type using the second transmission scheme, wherein the second transmission scheme is different from the first transmission scheme.

8. The method of claim 7, wherein transmitting the beacon of the first type using the first transmission scheme and the beacon of the second type using the second transmission scheme, comprises:
   searching the channel for any beacons of the second type; and
   when the wireless device detects beacons of the second type in the channel, then transmitting the beacon of the first type using the first transmission scheme and transmitting the beacon of the second type using the second transmission scheme in an existing superframe of the channel.

9. The method of claim 7, wherein transmitting the beacon of the first type using the first transmission scheme and the beacon of the second type using the second transmission scheme, comprises:
   searching the channel for any beacons of the second type; and
   when the wireless device does not detect any beacons of the second type in the channel, then establishing a superframe in the channel and transmitting via the superframe the beacon of the first type using the first transmission scheme and the beacon of the second type using the second transmission scheme.

10. The method of claim 7, further comprising when the power sensing indicates that the channel is not being used by any other wireless device that operates using a transmission scheme different from the second transmission scheme, then transmitting beacons of a third type using a third transmission scheme that cannot be received by the wireless device.

11. The method of claim 7, wherein the system is adapted to include K different types of wireless devices that are adapted to communicate using one of K different types of transmission schemes (K>2), and further comprising when the power sensing indicates that the channel is not being used by any other wireless device that operates using a transmission scheme different from the second transmission scheme, then transmitting K different beacons using all K transmission schemes, wherein K−1 of the beacons cannot be received by the wireless device.

12. In a wireless network adapted to include at least two different types of wireless devices including Type-A wireless devices adapted to communicate using a first transmission scheme and Type-B wireless devices adapted to communicate using a second transmission scheme different from the first transmission scheme, a method of communication by a first Type-A wireless device comprising:
   searching a channel for any beacons of a first type transmitted using the first transmission scheme that cannot be received by the Type-B wireless devices;
   decoding any received beacons of the first type to determine if any wireless devices other than Type-A wireless devices are operating in the channel; and
   when no beacons of the first type are received that indicate that any wireless devices other than Type-A wireless devices are operating in the channel, then transmitting in the channel a beacon of the first type using the first transmission scheme that cannot be received by the Type-B wireless devices.

13. The method of claim 12, further comprising when the first Type-A wireless device detects beacons of the first type in the channel indicating that another Type-A wireless device is operating in the channel, then transmitting the beacon of the first type using the first transmission scheme in an existing superframe of the channel.

14. The method of claim 12, further comprising when no beacons of the first type are received in the channel by the first Type-A wireless device, then establishing a superframe, and then transmitting via the superframe the beacon of the first type using the first transmission scheme.

15. The method of claim 12, further comprising when at least one beacon of the first type is received in the channel by the first Type-A wireless device indicating that one or more other wireless devices other than another Type-A wireless device is operating in the channel, then transmitting in the channel the beacon of the first type using the first transmission scheme to reserve a portion of the channel that is not being used by any of the one more other wireless device.

16. The method of claim 12, further comprising when at least one beacon of the first type is received in the channel by the first Type-A wireless device indicating that one or more other wireless devices other than another Type-A wireless device is operating in the channel, then switching to a second channel and searching the second channel for any beacons of the first type transmitted using the first transmission scheme.

17. The method of claim 12, further comprising:
   subsequent to establishing communication in the channel using the first transmission scheme, detecting a beacon of the first type indicating a presence of another system of wireless devices in a proximity to the first Type-A wireless device, the system including at least one Type-B wireless device communicating using the second transmission scheme; and
   thereafter only utilizing portions of the channel that are not being used by any Type-B wireless devices.

18. The method of claim 12, wherein the system is adapted to include K different types of wireless devices that are adapted to communicate using one of K different types of transmission schemes (K>2), and further comprising when the channel is not being used by any wireless devices other than Type-A wireless devices, then transmitting K different beacons using all K transmission schemes, wherein K−1 of the beacons cannot be received by the wireless device.

* * * * *